United States Patent
Cheng et al.

(10) Patent No.: US 11,551,626 B2
(45) Date of Patent: Jan. 10, 2023

(54) ELECTRONIC PAPER DISPLAY DEVICE AND OPERATION METHOD THEREOF

(71) Applicant: E Ink Holdings Inc., Hsinchu (TW)

(72) Inventors: Hsiao-Lung Cheng, Hsinchu (TW); Shu-Cheng Liu, Hsinchu (TW); Pei-Lin Tien, Hsinchu (TW); Cheng-Hsin Chu, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/581,989

(22) Filed: Jan. 24, 2022

(65) Prior Publication Data

US 2022/0301509 A1 Sep. 22, 2022

(30) Foreign Application Priority Data

Mar. 17, 2021 (TW) ................... 110109494

(51) Int. Cl.
*G09G 3/34* (2006.01)
*G06F 3/041* (2006.01)

(52) U.S. Cl.
CPC ......... *G09G 3/344* (2013.01); *G06F 3/04166* (2019.05); *G09G 2354/00* (2013.01); *G09G 2360/12* (2013.01); *G09G 2360/18* (2013.01)

(58) Field of Classification Search
CPC .... G02F 1/167; G09G 3/344; G09G 2354/00; G09G 2360/12; G09G 2360/127; G09G 2340/16; G09G 2360/18; G09G 3/3433; G06F 3/04166
See application file for complete search history.

(56) References Cited

U.S. PATENT DOCUMENTS

| | | | |
|---|---|---|---|
| 10,043,459 B1 | 8/2018 | de Greef | |
| 2011/0128266 A1 | 6/2011 | Chiu et al. | |
| 2014/0292670 A1 | 10/2014 | Cho | |
| 2016/0110002 A1* | 4/2016 | Chen | G06F 3/04883 345/173 |
| 2016/0188088 A1* | 6/2016 | Rodrigues De Araujo | G06F 3/04166 345/173 |
| 2021/0407467 A1* | 12/2021 | Koo | G09G 5/395 |

FOREIGN PATENT DOCUMENTS

| | | |
|---|---|---|
| CN | 202649973 | 1/2013 |
| TW | 201333758 | 8/2013 |

* cited by examiner

*Primary Examiner* — Dennis P Joseph
(74) *Attorney, Agent, or Firm* — JCIPRNET

(57) ABSTRACT

An electronic paper display device and an operation method thereof are provided. The electronic paper display device includes an electronic paper display panel and a timing controller. The timing controller includes a first image buffer memory, a second image buffer memory, and an update buffer memory. The timing controller receives a touch track data. The first image buffer memory and the second image buffer memory are a ping-pong buffer architecture, and receive a video stream in staggered timing. The second image buffer memory receives the touch track data and simultaneously updates a current display screen data stored in the update buffer memory when the first image buffer memory receives the video stream to update the current display screen data into the update buffer memory. The timing controller drives the electronic paper display panel according to the current display screen data.

12 Claims, 6 Drawing Sheets

ELECTRONIC PAPER DISPLAY DEVICE AND OPERATION METHOD THEREOF

CROSS-REFERENCE TO RELATED APPLICATION

This application claims the priority benefit of Taiwan application serial no. 110109494, filed on Mar. 17, 2021. The entirety of the above-mentioned patent application is hereby incorporated by reference herein and made a part of this specification.

BACKGROUND

Technical Field

This disclosure relates to a display device, and in particular to an electronic paper display device and an operation method thereof.

Description of Related Art

For a conventional electronic paper display device with a touch handwriting function, when a user performs touch handwriting on the electronic paper display panel integrated with a touch panel, the conventional electronic paper display device has to first provide the touch track data obtained from the touch handwriting to a host device to perform a track drawing operation on the display screen data, and then the display screen data drawn with a corresponding touch track pattern is re-transmitted to a timing controller to drive the electronic paper display panel. As such, the host device requires a lot of image processing time and computing resources to perform track drawing on frames of a video stream. Since a driving waveform of an electrophoresis unit of the electronic paper display panel still requires a driving period to complete, the electronic paper display panel is unable to respond to the touch or handwriting function of the electronic paper display device in time to provide a normal corresponding display effect. In view of this, several embodiments are proposed as follows.

SUMMARY

This disclosure provides an electronic paper display device and an operation method thereof, which can provide a handwriting function with a good user experience.

The electronic paper display device of the disclosure includes an electronic paper display panel and a timing controller. The timing controller is coupled to the electronic paper display panel. The timing controller includes a first image buffer memory, a second image buffer memory, and an update buffer memory, and is configured to receive a touch track data. The first image buffer memory and the second image buffer memory are a ping-pong buffer architecture, and are configured to receive a video stream in staggered timing. The second image buffer memory receives the touch track data and simultaneously updates a current display screen data stored in the update buffer memory when the first image buffer memory receives the video stream to update the current display screen data into the update buffer memory. The timing controller drives the electronic paper display panel according to the current display screen data.

The operation method of the disclosure is suitable for an electronic paper display device. The electronic paper display device includes an electronic paper display panel and a timing controller. The timing controller includes a first image buffer memory, a second image buffer memory, and an update buffer memory. The operation method includes the following steps. A video stream is received in staggered timing through the first image buffer memory and the second image buffer memory, in which the first image buffer memory and the second image buffer memory are a ping-pong buffer architecture. A touch track data is received through the second image buffer memory and a current display screen data stored in the update buffer memory is simultaneously updated when the video stream is received through the first image buffer memory to update the current display screen data into the update buffer memory. In addition the electronic paper display panel is driven by the timing controller according to the current display screen data.

Based on the above, the electronic paper display device and the operation method thereof according to the disclosure can quickly and simultaneously update the background image and the touch track (handwriting track) through the timing controller.

To make the above features and advantages more comprehensible, several embodiments accompanied by drawings are described in detail as follows.

DESCRIPTION OF THE EMBODIMENTS

Figure 1:
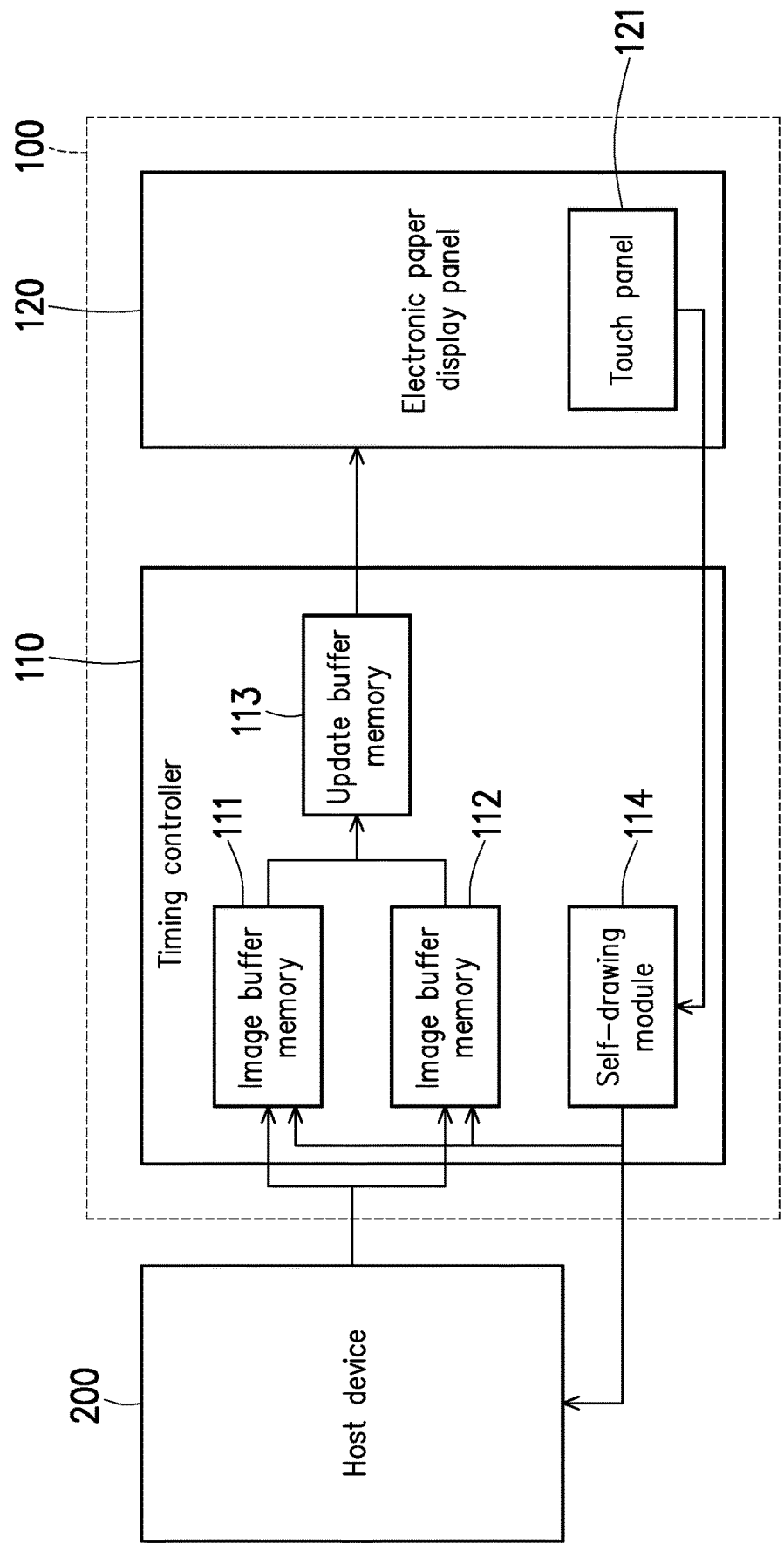
FIG. 1 is a block diagram of an electronic paper display device according to an embodiment of the disclosure.

In order to make the content of this disclosure more easily understandable, the following embodiments are specifically cited as examples according to which the disclosure can be implemented. In addition, wherever possible, elements/components/steps with the same reference numerals in the drawings and embodiments represent the same or similar parts.

FIG. 1 is a block diagram of an electronic paper display device according to an embodiment of the disclosure. With reference to FIG. 1, an electronic paper display device 100 includes a timing controller 110 and an electronic paper display panel 120. The timing controller (TCON) 110 is coupled to the electronic paper display panel 120. The timing controller 110 includes image buffer memories 111 and 112, an update buffer memory 113, and a self-drawing module 114. The electronic paper display panel 120 includes a pixel array composed of multiple electrophoretic units arranged in an array, and integrated with a touch panel 121, so as to provide a touch display function. In the embodiment, the timing controller 110 outputs multiple driving signals respectively corresponding to the multiple electrophoresis units according to a display screen data stored in the update buffer memory 113. The multiple driving signals respectively have driving waveforms. The timing controller 110 may further include a driving circuit (not shown) disposed between the timing controller 110 and the electronic paper display panel 120.

In the embodiment, the timing controller 110 may also be coupled to an external host device 200, and the host device 200 may provide a video stream to the timing controller 110.

In the embodiment, the image buffer memories 111 and 112 are a ping-pong buffer architecture (or a double buffer architecture), but the disclosure is not limited to the above-mentioned ping-pong buffer. Actually, there may be two or more buffer structures, and the embodiment is described using a simplest state. The image buffer memories 111 and 112 may be configured to receive the video stream provided by the host device 200 in staggered timing. In the embodiment, the timing controller 110 may also receive a touch track data provided by the touch panel 121 through the self-drawing module 114. In this regard, the touch track data may refer to, for example, a user performing a touch handwriting function (such as the user touching with a finger or touching with a stylus) on the electronic paper display panel 120 (the touch panel 121), so as to enable the touch panel 121 to re-transmit the corresponding touch track data. The touch track data may include multiple touch coordinate data corresponding to a continuous timing.

In the embodiment, the timing controller 110 may also include other related driving circuits and storage units to implement related operations described in various embodiments of the disclosure. In addition, the self-drawing module 114 may be, for example, a software program stored in a storage unit of the timing controller 110. In addition, the driving circuit of the timing controller 110 may write the touch track data to the display screen data temporarily stored in the image buffer memories 111 and 112 through execution of the self-drawing module 114, so as to enable a display screen corresponding to the display screen data temporarily stored in the image buffer memories 111 and 112. The display screen includes a corresponding touch track. In other words, the timing controller 110 of the embodiment may re-transmit the corresponding touch track data to drive the electronic paper display panel 120 and display the corresponding touch track according to the touch panel 121, without requiring the host device 200 to provide the display screen data corresponding to the touch portion. From another perspective, the timing controller 110 of the embodiment may have a function of automatically updating the display screen (that is, updating the touch track or a handwriting track). The timing controller 110 may generate a new display screen function (that is, using the display screen data provided by the host device 200 to add the touch track data or a handwriting track data).

In addition, the electronic paper display device 100 and the host device 200 may be integrated in a terminal device, and the host device 200 of this embodiment may be, for example, a central processing unit (CPU) or other processing chips of the terminal device, and configured to provide the video stream to the timing controller 110. In addition, in other embodiments of the disclosure, the host device 200 may also include a handwriting execution module to receive the touch track data provided by the self-drawing module 114 to update the display screen data in the video stream, so as to enable the display screen data in the video stream continuously provided by the host device 200 further includes a track pattern data corresponding to the touch track data.

Figure 2:
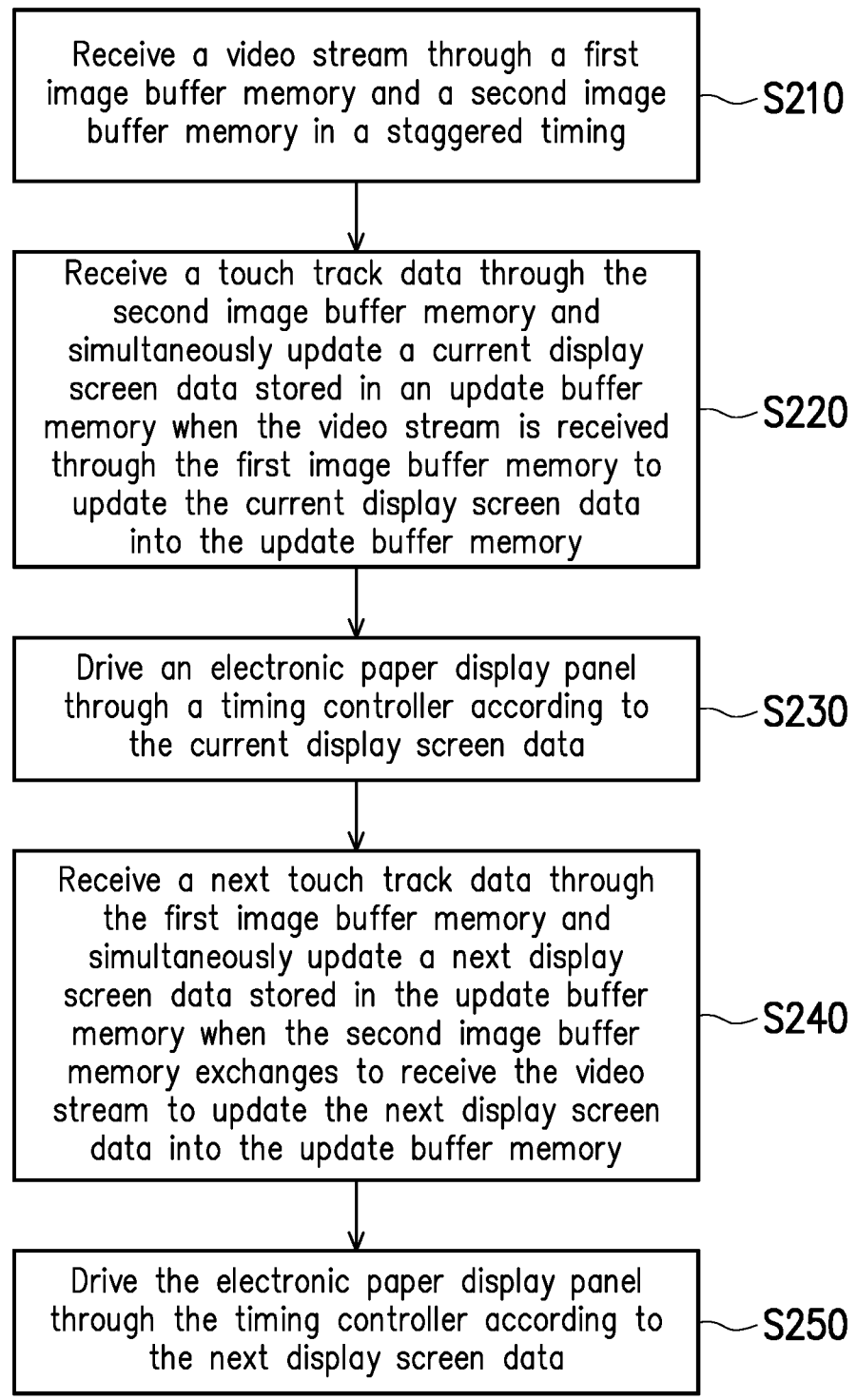
FIG. 2 is a flowchart of an operation method according to an embodiment of the disclosure.

FIG. 2 is a flowchart of an operation method according to an embodiment of the disclosure. With reference to FIGS. 1 and 2, during an initial operation of the electronic paper display device 100 in FIG. 1, the update buffer memory 113 and the self-drawing module 114 are not activated during a period when the electronic paper display device 100 receives a first image of the video stream provided by the host device 200 through the first image buffer memory (such as the image buffer memory 111 in FIG. 1). The electronic paper display device 100 activates the update buffer memory 113 and the self-drawing module 114 after the first image is received. The update buffer memory 113 reads the first image stored in the first image buffer memory to drive the electronic paper display panel 120, and the first image may be provided to the self-drawing module 114 for usage. The update buffer memory 113 and the self-drawing module 114 continue to read or use the first image buffer memory during a period when the electronic paper display device 100 receives a second image from the video stream provided by the host device 200 through a second image buffer memory (such as the image buffer memory 112 in FIG. 1). The update buffer memory 113 switches to read the second image stored in the second image buffer memory and the second image may be provided to the self-drawing module 114 for usage after the second image is received. The update buffer memory 113 and the self-drawing module 114 use the second image to serve as a background display data, and the update buffer memory 113 may compare the first image with the second image, so as to update a current display screen data to drive the electronic paper display panel 120. Then, an operation flow of the electronic paper display device 100 receiving each image after the third image may be as that described in the following Steps S210 to S250.

In the Step S210, the electronic paper display device 100 may receive the video stream provided by the host device 200 through the image buffer memories 111 and 112 in a staggered timing. At a point in time in the Step S220, the electronic paper display device 100 may receive the touch track data through the second image buffer memory (such as the image buffer memory 112 in FIG. 1), and simultaneously update the current display screen data stored in the update buffer memory 113 when the first image buffer memory (such as the image buffer memory 111 in FIG. 1) receives the video stream to update the current display screen data into the update buffer memory 113. In Step S230, the electronic paper display device 100 may drive the electronic paper display panel 120 through the timing controller 110 according to the current display screen data.

In the embodiment, the first image buffer memory (such as the image buffer memory 111 in FIG. 1) may receive the video stream to temporarily store a current background display data. In addition, the update buffer memory 113 may update a background portion of the current display screen data according to the current background display data. It should be noted that, in some embodiments of the disclosure, the timing controller 110 may compare the current background display data with the current display screen data to find the difference, and only update a portion of the screen that is different.

In the embodiment, the second image buffer memory (such as the image buffer memory 112 in FIG. 1) may receive the multiple touch coordinate data of the touch track data in continuous timing, so as to update a previous background display according to the touch track data. In this regard, a frame rate (or sensing frequency) of a touch frame of the touch panel 121 may be higher than an update rate (or frame frequency) of the video stream provided by the host device 200. In addition, the update buffer memory 113 may update the touch track in the current display screen data according to the updated previous background display data.

In some embodiments of the disclosure, the timing controller 110 may output corresponding multiple driving waveforms and drive multiple corresponding pixels in the electronic paper display panel 120 (that is, the multiple corresponding electrophoresis units) according to the touch track in the current display screen data, after the second image buffer memory (such as the image buffer memory 112 in FIG. 1) provides the updated previous background display data to the update buffer memory 113, so as to update the touch track in the current display screen data. However, driving the electrophoresis unit requires a driving period, and the driving period is longer than a frame period of the video stream. Therefore, the timing controller 110 may decide to output the multiple driving waveforms to drive at least a portion of pixels of the electronic paper display panel 120 according to a difference between the current display screen data and a display screen of the electronic paper display panel 120, and the timing controller 110 does not update a portion of the current display screen data stored in the update buffer memory 113 corresponding to the at least a portion of the pixels, before completion of the driving by the driving waveforms.

At a next point in time, in Step S240, the electronic paper displays device 100 may receive a next touch track data through the first image buffer memory (such as the image buffer memory 111 in FIG. 1) and simultaneously update a next display screen data stored in the update buffer memory 113 when the second image buffer memory (such as the image buffer memory 112 in FIG. 1) exchanges to receive the video stream to update the next display screen data into the update buffer memory 113. In Step S250, the electronic paper display device 100 drives the electronic paper display panel 120 through the timing controller 110 according to the next display screen data.

In the embodiment, the Steps S220 to S250 may be executed in a cycle, and subsequent update of the display screen data may be deduced by analogy. Therefore, the operation method and the electronic paper display device 100 of the embodiment use the timing controller 110 to perform the function of automatically updating the display screen (the touch track or handwriting track).

Figure 3A:
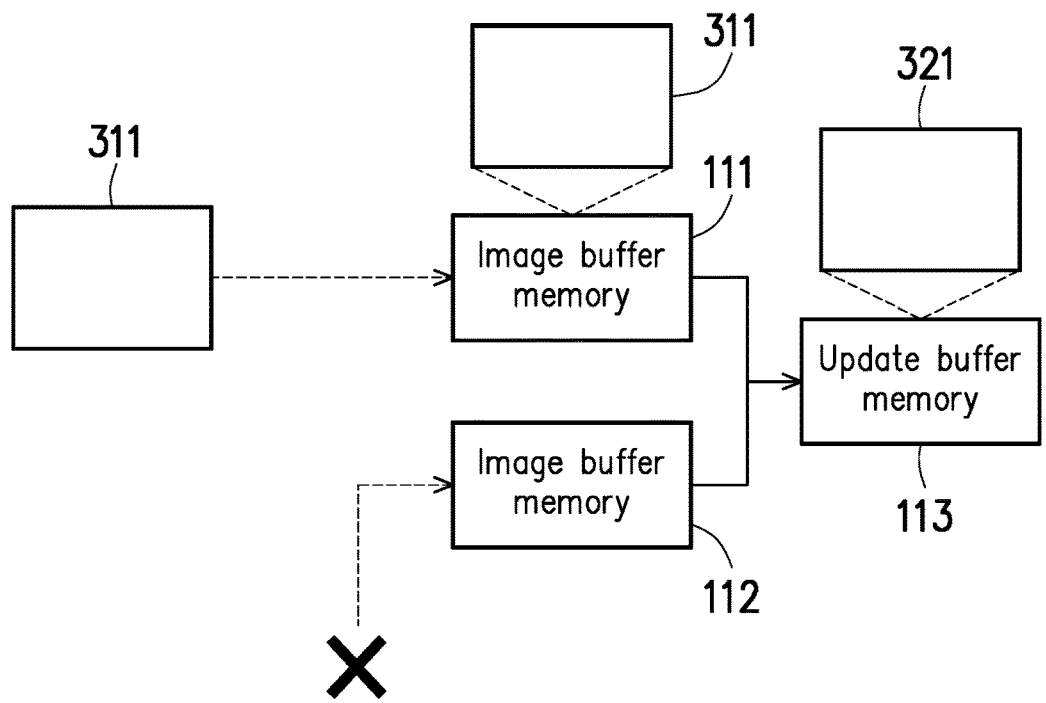
FIGS. 3A to 3D are schematic diagrams of multiple image data writing scenarios according to an embodiment of the disclosure.

FIGS. 3A to 3D are schematic diagrams of multiple image data writing scenarios according to an embodiment of the disclosure. With reference to FIG. 1 and FIGS. 3A to 3D, an implementation example of the host device 200 not executing a handwriting function module (handwriting function software) is as follows. With reference to FIG. 3A, at a first time point (such as a time t0), the image buffer memory 111 first receives and temporarily stores a first frame 311 of the video stream provided by the host device 200. The first frame 311 may be regarded as a background frame. The image buffer memory 112 does not receive the touch track data. The image buffer memory 111 may update the first frame 311 to the update buffer memory 113, to enable the timing controller 110 to drive the electronic paper display panel 120 according to a frame 321 stored in the update buffer memory 113.

Figure 3B:
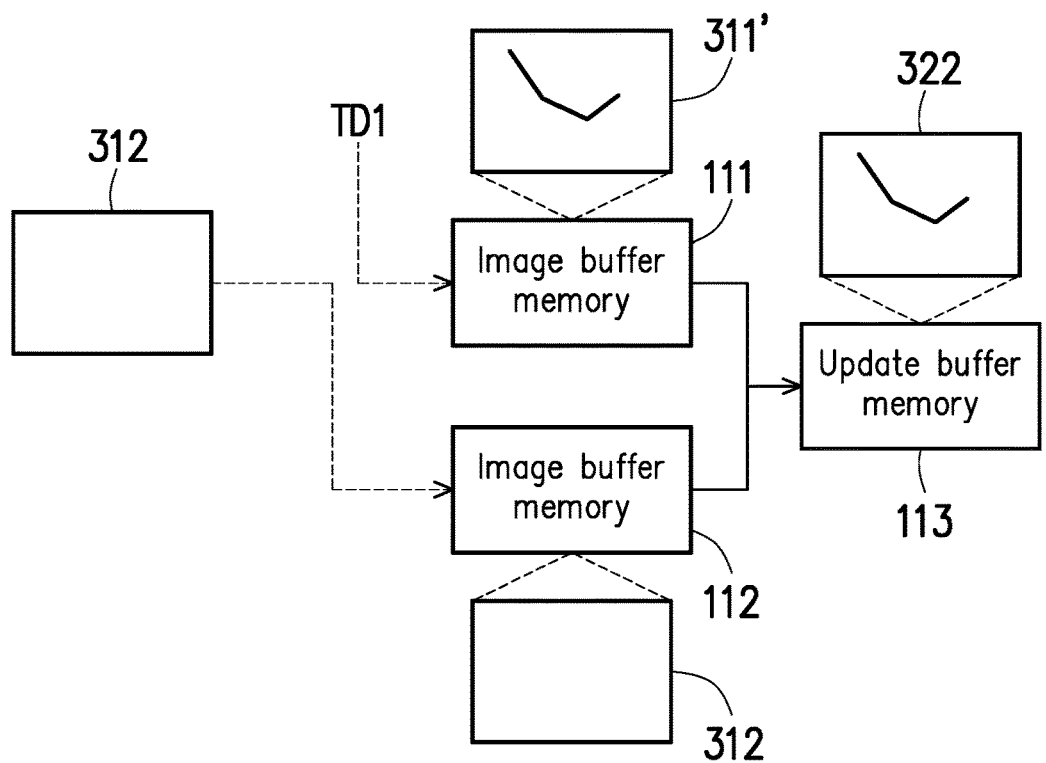

Next, with reference to FIG. 3B, at a second time point (such as a time t1), the image buffer memory 112 may exchange to receive and temporarily store a second frame 312 of the video stream provided by the host device 200. The second frame 312 may be regarded as a background frame. The first frame 311 and the second frame 312 may be the same blank screen, the same content screen, or different screens. The image buffer memory 111 may receive a first touch track data TD1 provided by the self-drawing module 114, and update the first touch track data TD1 to a currently temporarily stored first frame 311'. As shown in FIG. 3B, the first frame 311' may include a touch track corresponding to the first touch track data TD1. In FIG. 3B, the update buffer memory 113 updates a background portion of a frame 322 (that is, updates the background portion of the current display screen data) according to the second frame 312. In FIG. 3B, the update buffer memory 113 updates a touch track portion of the frame 322 (that is, updates the touch track portion of the display screen data) according to the updated first frame 311'. The timing controller 110 drives the electronic paper display panel 120 according to the frame 322 stored in the update buffer memory 113.

Figure 3C:
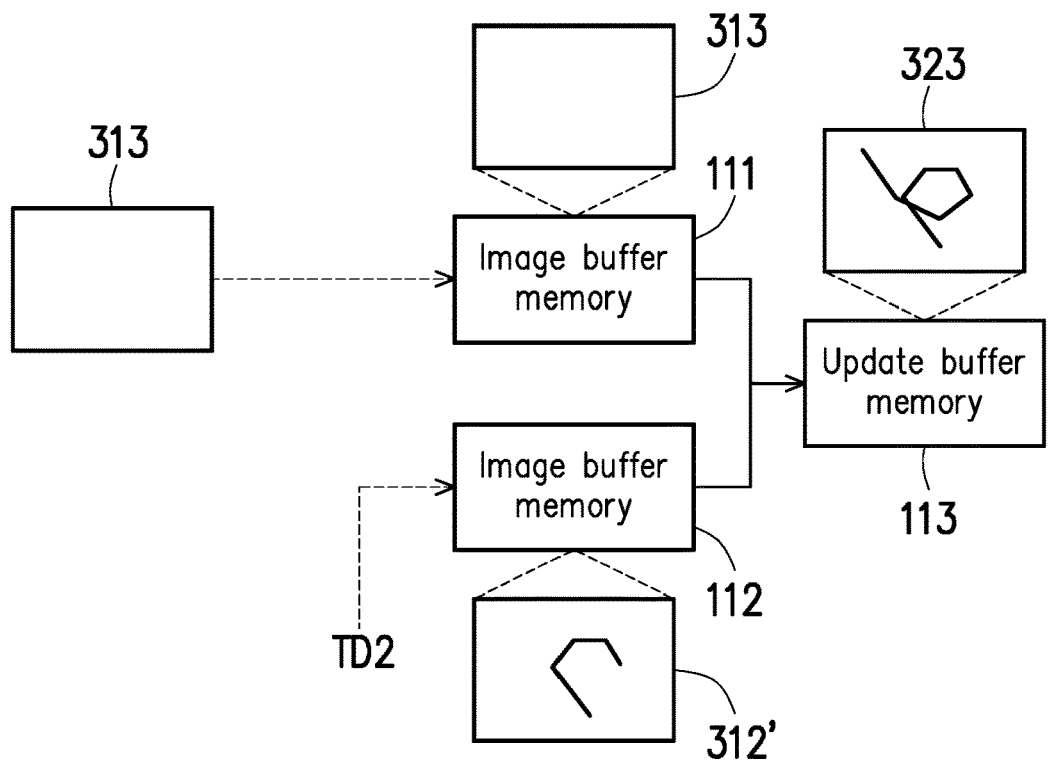

Next, with reference to FIG. 3C, at a third time point (such as a time t2), the image buffer memory 111 receives and temporarily stores a third frame 313 of the video stream provided by the host device 200. The third frame 313 may be regarded as a background frame. The second frame 312 and the third frame 313 may be the same blank screen, the same content screen, or different screens. The image buffer memory 112 receives a second touch track data TD2 provided by the self-drawing module 114, and updates the second touch track data TD2 to a currently temporarily stored second frame 312'. As shown in FIG. 3C, the second frame 312' may include a touch track corresponding to the second touch track data TD2. In FIG. 3C, the update buffer memory 113 updates a background portion of a frame 323 according to the third frame 313 (that is, updates the background portion of the current display screen data). In FIG. 3C, the update buffer memory 113 updates a touch track portion of the frame 323 (that is, updates the touch track portion of the display screen data) according to the updated second frame 312'. The timing controller 110 drives the electronic paper display panel 120 according to the frame 323 stored in the update buffer memory 113. It should be noted that since driving by the multiple driving waveforms provided by the touch track portion of the frame 322 at the previous time point t2 corresponding to the timing controller 110 is not yet completed, the timing controller 110 does not update a portion in the frame 323 stored in the update buffer memory 113 corresponding to the touch track portion of the frame 322. Therefore, the frame 323 still retains the portion of the touch track in the frame 322.

Figure 3D:
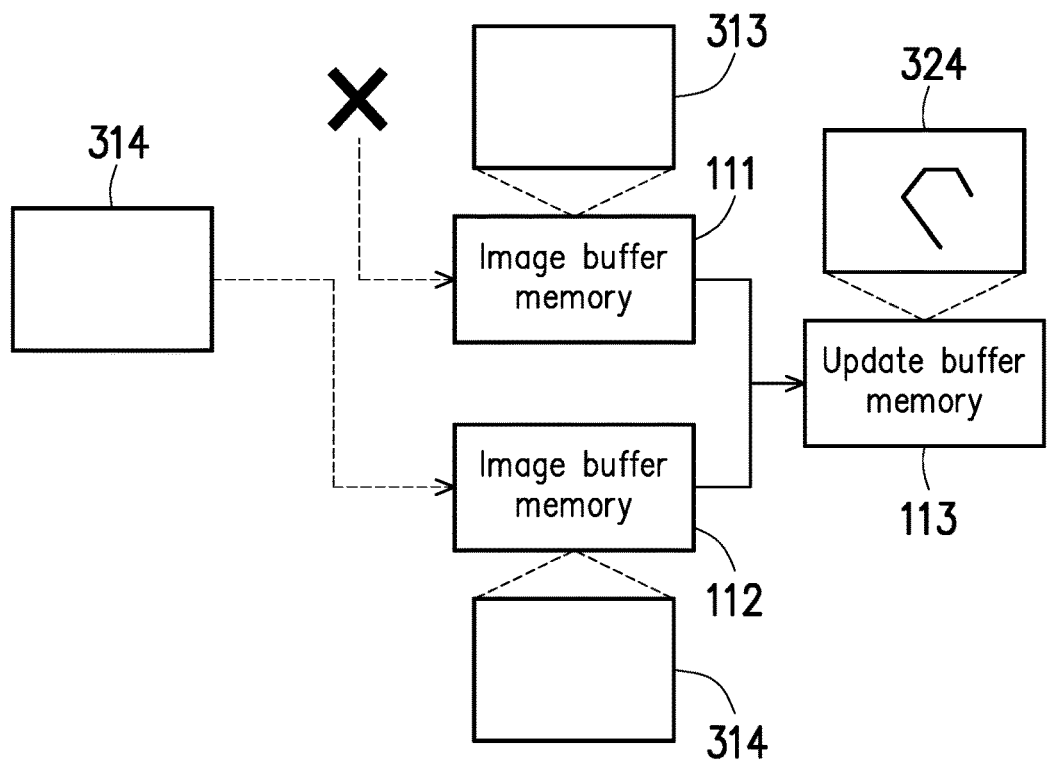

Next, with reference to FIG. 3D, at a fourth time point (such as a time t3), the image buffer memory 112 receives and temporarily stores a fourth frame 314 of the video stream provided by the host device 200. The fourth frame 314 may be regarded as a background frame. The third frame 313 and the fourth frame 314 may be the same blank screen, the same content screen, or different screens. The image buffer memory 111 may exchange but does not receive the touch track data. As shown in FIG. 3D, the third frame 313 is not updated. In FIG. 3D, the update buffer memory 113 updates a background portion of a frame 324 according to the fourth frame 314 (that is, updates the background portion of the current display screen data). In FIG. 3D, the update buffer memory 113 updates the frame 324 according to the updated third frame 313, so as to enable no touch track to be in the display screen data. The timing controller 110 drives the electronic paper display panel 120 according to the frame 324 stored in the update buffer memory 113. It should be noted that since driving of the multiple driving waveforms provided by the touch track portion of the frame 323 at the previous time point t3 corresponding to the timing controller 110 is not yet completed, the timing controller 110 does not update a portion in the frame 324 stored in the update buffer memory 113 corresponding to the touch track portion of the frame 323. Therefore, the frame 324 still retains the portion of the touch track in the frame 323. However, the frame 324 corresponding to the touch track portion of the frame 322 is cleared (as according to the updated result of the third frame 313). Therefore, in the implementation examples of FIGS. 3A to 3D, the electronic paper display panel 120 may display a touch track or a handwriting track inputted by the user, and the touch track or the handwriting track inputted by the user disappears dynamically according to the timings.

Figure 4A:
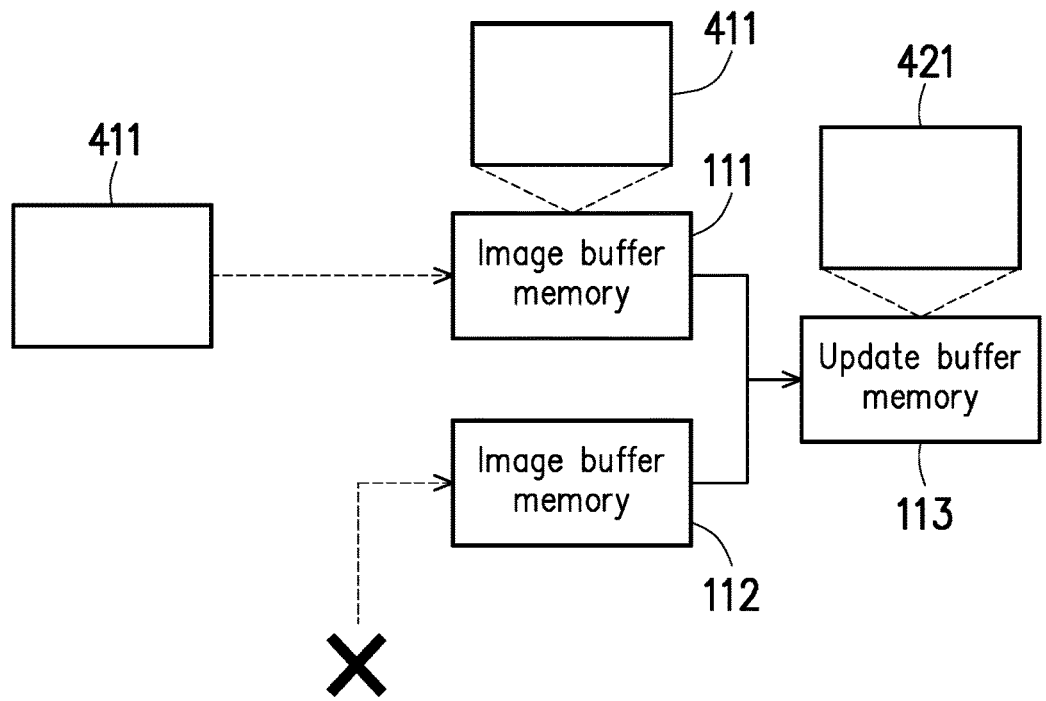
FIGS. 4A to 4D are schematic diagrams of multiple image data writing scenarios according to another embodiment of the disclosure.

FIGS. 4A to 4D are schematic diagrams of multiple image data writing scenarios according to another embodiment of the disclosure. With reference to FIG. 1 and FIGS. 4A to 4D, an implementation example of the host device 200 executing the handwriting function module (handwriting function software) is as follows. With reference to FIG. 4A, at a first time point (such as a time t0'), the image buffer memory 111 first receives and temporarily stores a first frame 411 of the video stream provided by the host device 200. The first frame 411 may be regarded as a background frame. The image buffer memory 112 does not receive the touch track data. The image buffer memory 111 may update the first frame 411 to the update buffer memory 113, to enable the timing controller 110 to drive the electronic paper display panel 120 according to a frame 421 stored in the update buffer memory 113.

Figure 4B:
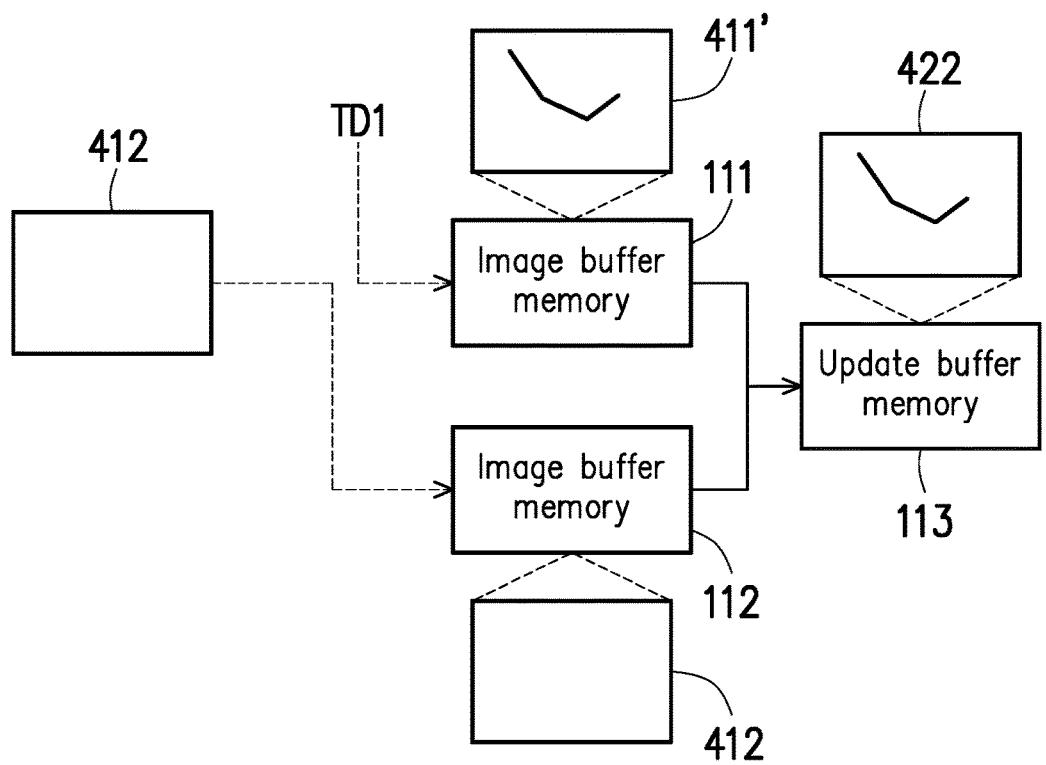

Next, with reference to FIG. 4B, at a second time point (such as a time t1'), the image buffer memory 112 receives and temporarily stores a second frame 412 of the video stream provided by the host device 200. The second frame 412 may be regarded as a background frame. The first frame 411 and the second frame 412 may be the same blank screen, the same content screen, or different screens. The image buffer memory 111 may receive the first touch track data TD1 provided by the self-drawing module 114, and update the first touch track data TD1 to a currently temporarily stored first frame 411'. As shown in FIG. 4B, the first frame 411' may include a touch track corresponding to the first touch track data TD1. In FIG. 4B, the update buffer memory 113 updates a background portion of a frame 422 according to the second frame 412 (that is, updates the background portion of the current display screen data). In FIG. 4B, the update buffer memory 113 updates a touch track portion of the frame 422 (that is, updates the touch track portion of the display screen data) according to the updated first frame 411'. The timing controller 110 drives the electronic paper display panel 120 according to the frame 422 stored in the update buffer memory 113. It should be noted that the handwriting function module executed by the host device 200 may also receive the first touch track data TD1 provided by the self-drawing module 114 and update the display screen data in the video stream according to the first touch track data TD1, so as to enable the display screen data to include the touch track data.

Figure 4C:
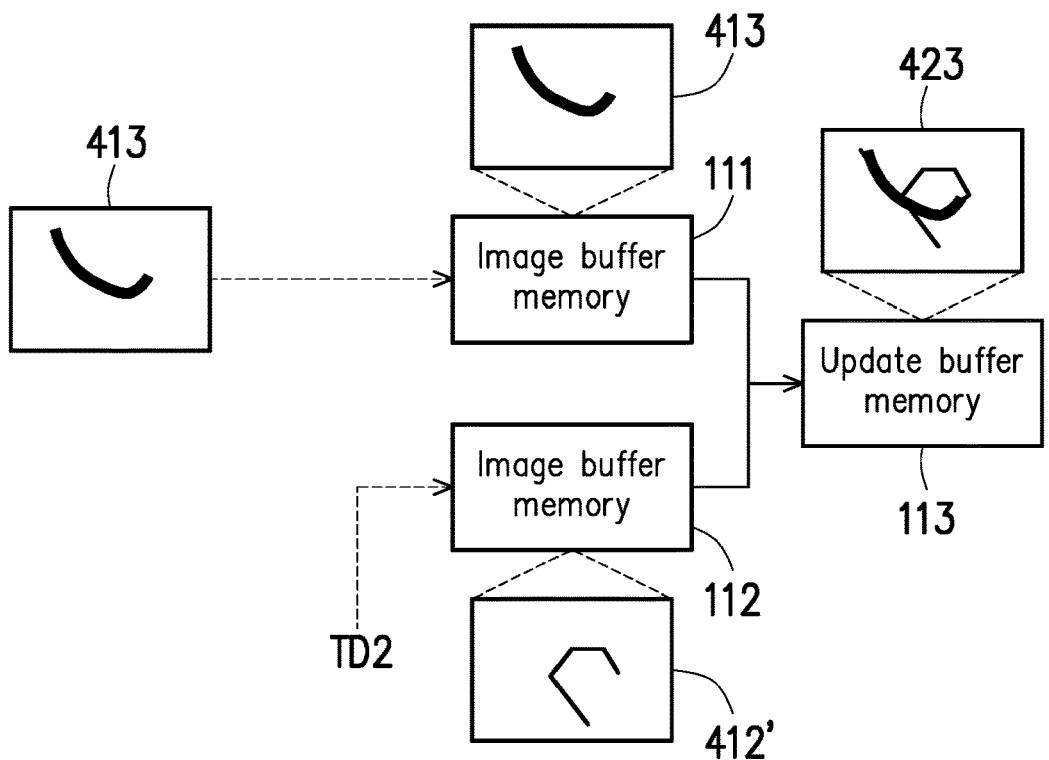

Next, with reference to FIG. 4C, at a third time point (such as a time t2'), the image buffer memory 111 receives and temporarily stores a third frame 413 of the video stream provided by the host device 200. The third frame 413 may be regarded as a background frame. It should be noted that unlike the embodiment in FIG. 3C, frame content of the third frame 413 in this embodiment includes a touch track pattern corresponding to the first touch track data TD1. The second frame 412 and the third frame 413 may be the same blank screen, the same content screen, or different screens. The image buffer memory 112 receives the second touch track data TD2 provided by the self-drawing module 114, and updates the second touch track data TD2 to a currently temporarily stored second frame 412'. As shown in FIG. 4C, the second frame 412 may include a touch track corresponding to the second touch track data TD2. In FIG. 4C, the update buffer memory 113 updates a background portion of a frame 423 according to the third frame 413 (that is, updates the background portion of the current display screen data). In FIG. 4C, the update buffer memory 113 updates a touch track portion of the frame 423 (that is, updates the touch track portion of the display screen data) according to the updated second frame 412'. The timing controller 110 drives the electronic paper display panel 120 according to the frame 423 stored in the update buffer memory 113. It should be noted that since driving by the multiple driving waveforms provided by the touch track portion of the frame 422 at the previous time point t2' corresponding to the timing controller 110 is not yet completed, the timing controller 110 does not update a portion in the frame 423 stored in the update buffer memory 113 corresponding to the touch track portion of the frame 422. Therefore, the frame 423 still retains the portion of the touch track in the frame 422. In addition, a touch track pattern in the third frame 413 overlaps with a portion in the frame 423 corresponding to the touch track portion of the frame 422. It should be noted that the handwriting function module executed by the host device 200 may also receive the second touch track data TD2 provided by the self-drawing module 114 and update the display screen data in the video stream according to the second touch track data TD2, to enable the display screen data to include the touch track data.

Figure 4D:
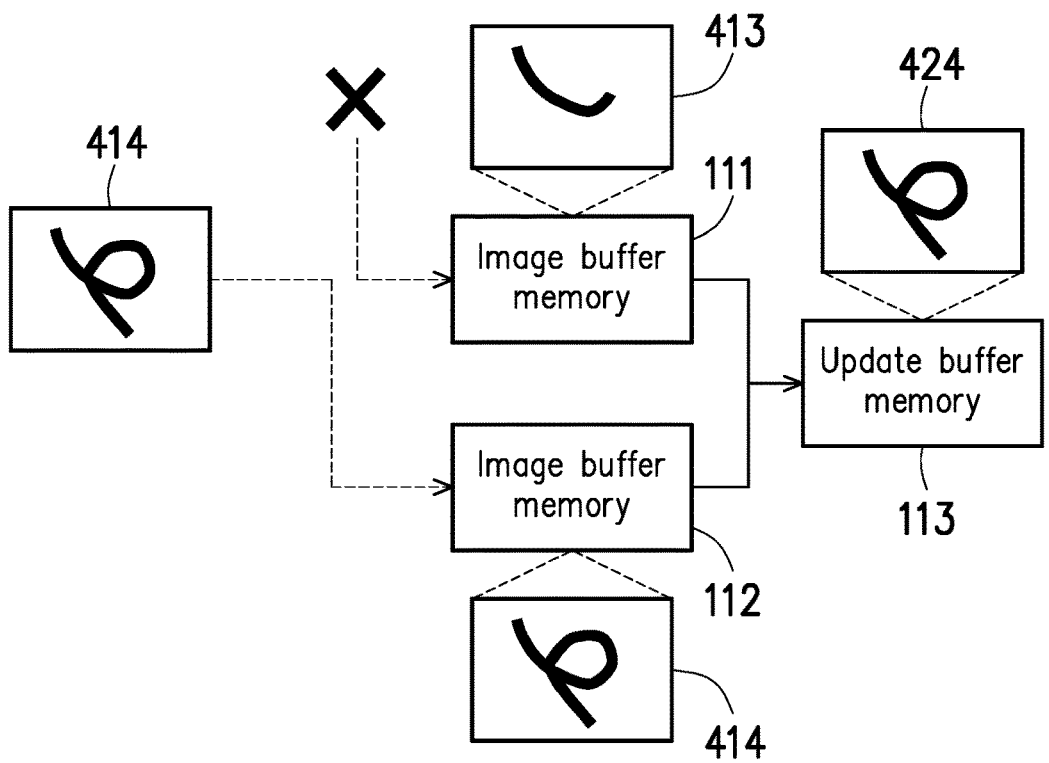

Next, with reference to FIG. 4D, at a fourth time point (such as a time t3'), the image buffer memory 112 receives and temporarily stores a fourth frame 414 of the video stream provided by the host device 200. The fourth frame 414 may be regarded as a background frame. It should be noted that unlike the embodiment in FIG. 3C, frame content of the fourth frame 414 in this embodiment includes touch track patterns corresponding to the first touch track data TD1 and the second touch track data TD2. The third frame 413 and the fourth frame 414 may be the same blank screen, the same content screen, or different screens. The image buffer memory 111 may exchange but does not receive the touch track data. As shown in FIG. 4D, the third frame 413 is not updated. In FIG. 4D, the update buffer memory 113 updates a background portion of a frame 424 according to the fourth frame 414 (that is, updates the background portion of the current display screen data). In FIG. 4D, the update buffer memory 113 updates the frame 424 according to the updated third frame 413, so as to enable the display screen data to retain the touch track pattern corresponding to the first touch track data TD1. However, unlike the embodiment in FIG. 3D, the frame content of the fourth frame 414 includes touch track patterns corresponding to the first touch track data TD1 and the second touch track data TD2. The frame content of the fourth frame 414 covers the third frame 413, therefore the frame 424 may have the same frame content as the fourth frame 414. The timing controller 110 drives the electronic paper display panel 120 according to the frame 424 stored in the update buffer memory 113. Therefore, in the implementation examples of FIGS. 4A to 4D, the electronic paper display panel 120 may display a touch track or a handwriting track inputted by the user, and the touch track or the handwriting track inputted by the user is continuously displayed on the display screen of the electronic paper display panel 120.

In summary, the electronic paper display device and the operation method thereof according to the disclosure can use the ping-pong buffer architecture in the timing controller to implement the function of simultaneously updating the background image and the touch track (handwriting track). The electronic paper display device and the operation method thereof according to the disclosure may perform determination of each of the pixels (that is, each of the electrophoresis units) of the electronic paper display panel, so as to determine whether the driving waveforms in the driving process are completed to decide whether to update the current display screen data in the update buffer memory. Therefore, the electronic paper display device and the operation method thereof according to the disclosure can provide a good display effect in response to the touch or handwriting function of the electronic paper display device.

Although the disclosure has been described with reference to the above-mentioned embodiments, they are not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. An electronic paper display device, comprising:
    an electronic paper display panel; and
    a timing controller, coupled to the electronic paper display panel, wherein the timing controller comprises a first image buffer memory, a second image buffer memory, and an update buffer memory, and is configured to receive a touch track data,
    wherein the first image buffer memory and the second image buffer memory are a ping-pong buffer architecture, and are configured to receive a video stream in staggered timing,
    wherein the second image buffer memory receives the touch track data and simultaneously updates a current display screen data stored in the update buffer memory when the first image buffer memory receives the video stream to update the current display screen data into the update buffer memory,
    wherein the timing controller drives the electronic paper display panel according to the current display screen data.

2. The electronic paper display device according to claim 1, wherein the first image buffer memory receives the video stream to temporarily store a current background display data, and the update buffer memory updates a background portion of the current display screen data according to the current background display data.

3. The electronic paper display device according to claim 2, wherein the second image buffer memory receives a plurality of touch coordinate data of the touch track data in continuous timing, so as to update a previous background display data according to the touch coordinate data, and the update buffer memory updates a touch track portion of the current display screen data according to the updated previous background display data.

4. The electronic paper display device according to claim 1, wherein the timing controller decides to output a plurality of driving waveforms to drive at least a portion of pixels of the electronic paper display panel according to a difference between the current display screen data and a display screen of the electronic paper display panel, and the timing controller does not update a portion of the current display screen data stored in the update buffer memory corresponding to the at least a portion of the pixels before completion of driving by the driving waveforms.

5. The electronic paper display device according to claim 1, wherein the timing controller re-transmits the touch track data to a handwriting function module executed by a host device, and the handwriting function module updates a display screen data in the video stream according to the touch track data, so as to enable the display screen data to comprise the touch track data.

6. The electronic paper display device according to claim 1, wherein the first image buffer memory receives a next touch track data and simultaneously updates a next display screen data stored in the update buffer memory when the second image buffer memory exchanges to receive the video stream to update the next display screen data into the update buffer memory,
    wherein the timing controller drives the electronic paper display panel according to the next display screen data.

7. An operation method of an electronic paper display device, wherein the electronic paper display device comprises an electronic paper display panel and a timing controller, and the timing controller comprises a first image buffer memory, a second image buffer memory, and an update buffer memory, the operation method comprising:
    receiving a video stream in staggered timing through the first image buffer memory and the second image buffer memory, wherein the first image buffer memory and the second image buffer memory is a ping-pong buffer architecture;
    receiving a touch track data through the second image buffer memory, and simultaneously updating a current display screen data stored in the update buffer memory when the video stream is received through the first image buffer memory to update the current display screen data into the update buffer memory; and
    driving the electronic paper display panel by the timing controller according to the current display screen data.

8. The operation method of the electronic paper display device according to claim 7, wherein receiving the video stream through the first image buffer memory to update the current display screen data into the update buffer memory comprises:
    receiving the video stream through the first image buffer memory to temporarily store a current background display data; and
    updating a background portion of the current display screen data through the update buffer memory according to the current background display data.

9. The operation method of the electronic paper display device according to claim 8, wherein receiving the touch track data through the second image buffer memory and simultaneously updating the current display screen data stored in the update buffer memory comprises:
    receiving a plurality of touch coordinate data of the touch track data through the second image buffer memory in continuous timing, so as to update a previous background display data according to the touch coordinate data; and
    updating a touch track portion of the current display screen data through the update buffer memory according to the updated previous background display data.

10. The operation method of the electronic paper display device according to claim 7, further comprising:
    deciding to output a plurality of driving waveforms to drive at least a portion of pixels of the electronic paper display panel through the timing controller according to a difference between the current display screen data and a display screen of the electronic paper display panel,
    not updating a portion of the current display screen data stored in the update buffer memory corresponding to the at least a portion of the pixels by the timing controller before completion of driving by the driving waveforms.

11. The operation method of the electronic paper display device according to claim 7, further comprising:
- re-transmitting the touch track data to a handwriting function module executed by a host device through the timing controller; and
- updating a display screen data in the video stream by the handwriting function module according to the touch track data, so as to enable the display screen data to comprise the touch track data.

12. The operation method of the electronic paper display device according to claim 7, further comprising:
- receiving a next touch track data through the first image buffer memory and simultaneously updating a next display screen data stored in the update buffer memory when the second image buffer memory exchanges to receive the video stream to update the next display screen data into the update buffer memory; and
- driving the electronic paper display panel through the timing controller according to the next display screen data.

* * * * *